Mar. 3, 1925.
J. H. DENNEDY
PISTON
Filed Dec. 10, 1921
1,528,733
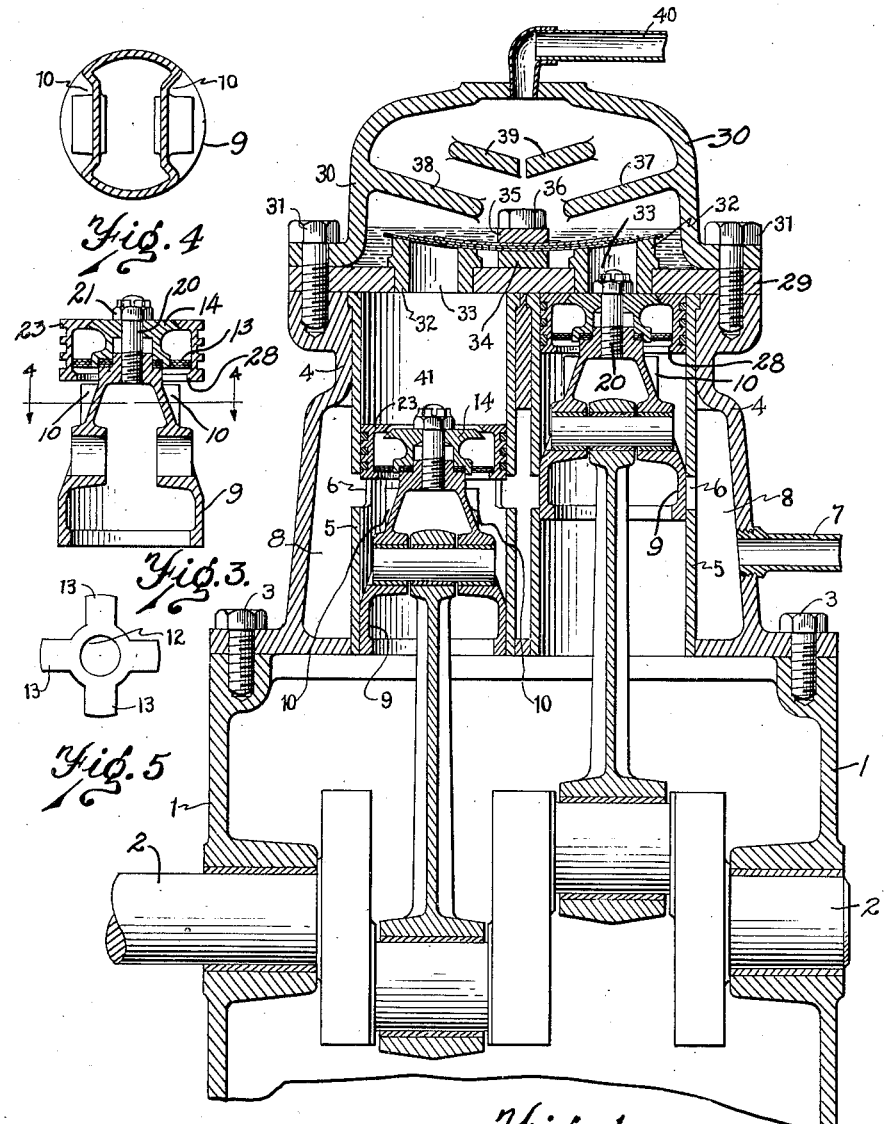
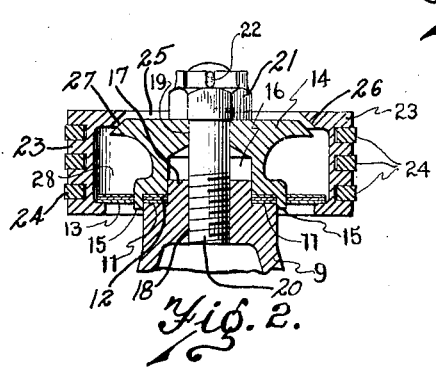
Inventor
James. H. Dennedy.
By Charles E. Wiser
Attorney Patented Mar. 3, 1925.

1,528,733

UNITED STATES PATENT OFFICE.

JAMES H. DENNEDY, OF DETROIT, MICHIGAN.

PISTON.

Application filed December 10, 1921. Serial No. 521,425.

*To all whom it may concern:*

Be it known that I, JAMES H. DENNEDY, a citizen of the United States, residing at Detroit, county of Wayne, State of Michigan, have invented a certain new and useful Improvement in Pistons, and declare the following to be a full, clear, and exact description of the same, such as will enable others skilled in the art to which it pertains to make and use the same, reference being had to the accompanying drawings, which form a part of this specification.

This invention relates to pistons and piston valves and the object of the invention is to provide a piston for a compressor formed to provide a valve which is entirely automatic in operation. A further object of the invention is to provide a piston for a compressor including a valve and valve seat which is automatically controlled by the reciprocating motion of the piston. A still further object of the invention is to provide a piston composed of two parts, a valve carrying part which is pivotally attached to a connecting rod and a part carrying the valve seat which is movable in relation to the valve and is limited in its movement in one direction by a series of spring arms and in the opposite direction by engagement with the valve. A novel feature of the invention is involved in the construction whereby the valve seat is moved instead of the valve to open or close the air inlet. These objects and the several novel features of the invention are hereinafter more fully described and claimed and the preferred form of construction by which these objects are attained is shown in the accompanying drawings in which—

Fig. 1 is a section through a compressor showing my improved piston and inlet valve mounted therein.

Fig. 2 is an enlarged section through the valve end of the piston.

Fig. 3 is a section through one of the pistons with the valve in the closed position.

Fig. 4 is a section taken on line 4—4 of Fig. 3.

Fig. 5 is a view of the spring member for limiting the valve seat portion in its opening movement.

As shown in Fig. 1 a crank case 1 is provided in which a crank shaft 2 is rotatably mounted. Mounted on the crank case 1 and secured thereto by bolts 3 is a cylinder head or casing 4 having a pair of cylinders 5 therein. Each cylinder 5 is provided with a pair of air intake openings 6 and an air supply line 7 enters the casing 4 and is adapted by means of the surrounding chamber 8 to supply air to the cylinder. A piston 9 is provided for each cylinder 5, formed to provide a chamber 10 on each side thereof as shown more particularly in Fig. 4, the said piston being closed at the lower end on all sides to prevent communication with the crank case. At the upper end the piston 9 as shown in Fig. 2 is provided with an annular shoulder 11 on which the portion 12 of a laminated spring spider seats. This spring spider is provided with four outwardly extending arms 13 and a valve 14 is provided having four fingers 15 engaging over the portion 12 of the spider between the arms 13. The valve 14 is provided with a recess 16 in which the upper end 17 of the piston extends, the said upper end of the piston being provided with a threaded aperture 18 and the valve 14 being provided with an aperture 19. A stud 20 shown more particularly in Fig. 2 is threaded into the aperture 18 and extends upwardly through the aperture 19 in the valve and a castellated nut 21 is threaded onto the upper end of the stud 20 and binds the valve to the upper end of the piston 9, the threading of the said nut on the stud clamping the laminated spring spider between the shoulder 11 of the piston and the valve. The nut 21 is locked in place on the stud 20 by a cotter pin 22 which is inserted through an aperture through the stud and extends through recesses provided in opposite sides of the castellated nut as will be readily understood. The piston is provided at the upper end with a floating part 23 which carries a series of piston rings 24 and the part 23 is provided with an opening 25 providing a valve seat 26 conforming to the companion valve face 27. The piston part 23 is provided with an inwardly extending flange 28 at its lower edge as shown in Fig. 2 which is adapted to be engaged by the ends of the arms 13 and limit the extent of the opening of the valve by downward movement of the piston and valve. The spider 13 is made up of a plurality of thin spring metal laminations so that the device may be easily assembled. As the outside diameter of the four outwardly extending arms must be greater than the inside diameter of the inwardly extending flange 28 at the lower end of the member 23, each lamination must be sufficiently flexible to be sprung over the flange 28 one at a time and when all of the laminations have been correctly positioned the combined strength thereof is sufficient to prevent the spider from again being sprung over the flange and allow separation of the floating portion 23 and the piston 9.

The portion 23 of the piston is limited in its closing movement by the valve seat 26 engaging the valve face 27 at which time the flange 28 is spaced from the arms 13 as shown in Fig. 3. As shown in Fig. 1 a plate 29 is provided which covers the upper ends of the cylinders 5 and which is secured in place between the head 30 and the casing 4 by the bolts 31. This plate 29 is provided with a central aperture over each cylinder and a member 32 is made a press fit in each aperture. The upper end of each member 32 as shown, is cut on a curve to provide a valve seat and a valve is provided comprising a flat spring of three leaves adapted to cover the discharge openings 33 of the cylinder and seat on the upper end of the members 32, the face of the lower plate of the spring being ground to provide a tight seat. These spring leaves are bound together at the center between two plates 34 and 35 which are secured together at opposite ends by the bolts 36. These spring leaves in combination with the members 32 form the exhaust valves for the cylinders but it is to be understood that any type of exhaust valve which opens at a certain pressure may be used in this device, this application being drawn particularly to the piston and inlet valve combined therewith and the peculiar exhaust valve construction described is the basis of a subsequent application Serial No. 521,426 filed December 10, 1921. A series of baffles 37, 38 and 39 are provided in the head 30 and an exhaust line 40 is connected into the said head through which the compressed air may pass.

In operation the crank shaft 2 is rotated which raises the piston on the left of Fig. 1 and lowers the piston on the right of Fig. 1. As the piston 9 on the left of Fig. 1 is moved upwardly by means of the connecting rod, the valve 14 is moved into its seat in the portion 23 of the piston and is held in its seat by upward movement of the piston 9 and thus prevents the escape of air downwardly. During upward movement of the piston the pressure is built up in the chamber 41 until sufficient to overcome the resistance of the spring leaves which forces the leaves upwardly from the seat and allows the compressed air to pass about the several baffles and outwardly through the discharge line 40, the piston at this time being in the position shown at the right of Fig. 1. As the piston 9 is again drawn downwardly by the connecting rod, the valve 14 is drawn out of engagement with its seat until the ends of the arms 13 strike the flange 28 which draws the portion 23 downwardly with the remainder of the piston, the valve remaining out of engagement with its seat as shown at the left of Fig. 1. During the downward stroke of the piston the air from the chamber 8 enters through the apertures 6 in the cylinder and passes through the chambers 10 on each side of the piston 9 and upwardly between the arms 13 of the spring spider and thence through the valve opening into the chamber 41 which fills the chamber with air. As the piston again reaches its lowermost position as shown at the left of Fig. 1, it is again forced upwardly as described to compress the air in the chamber, the inlet valve being closed by upward movement of the piston and opened by downward movement of the piston. As is usual in compressors, a considerable quantity of the lubricating oil is pumped outwardly through the exhaust valves and, for this reason the baffles 37, 38 and 39 are provided to cause the compressed air to take a circuitous path and, as the compressed air passes these baffles the oil collects thereon and due to the slope of the baffles drains into the chamber about the exhaust valves as shown. This extracts the oil from the air so that comparatively clean compressed air is delivered through the exhaust line 40 and this oil acts as a seal for the exhaust valves upon downward stroke of the pistons. It will also be noted that the oil does not interfere with the operation of the device on the compression stroke, the compressed air when passing through the exhaust valve blowing the oil away from the opening 33 and preventing its return into the cylinder.

From the foregoing description, it becomes evident that the device is very simple and efficient in operation, will not easily get out of order, is easily and cheaply constructed, and provides a device which accomplishes the objects described.

Having thus fully described my invention, its utility and mode of operation, what I claim and desire to secure by Letters Patent of the United States is—

1. A piston for use in a cylinder having a pair of inlet ports, comprising in combination a hollow head portion having a central aperture provided with a valve seat, a series of piston rings carried by the said head portion, a second portion to which power is applied for reciprocation having chambers on opposite sides thereof into which the said ports open, the said second portion being provided with an annular shoulder at the upper end, a plurality of spring spiders seating on the said shoulder, a valve secured to the said second portion in a manner to bind the plurality of spring spiders in correct relative position on the said shoulder, the said hollow head being in communication with the said chambers and having an internal flange at the lower edge, the arrangement being such that downward movement of the second portions away from the valve seat is limited by the spiders engaging the flange of the head portion, and upward movement thereof in relation to the head portion is limited by the valve engaging its seat.

2. A piston for use in a cylinder having a pair of inlet ports; comprising in combination a hollow head portion having a central aperture provided with a valve seat, a series of piston rings carried by the said head portion, a second portion to which power is applied for reciprocation having chambers on opposite sides thereof into which said ports open, a valve secured to the said second portion and adapted to seat in the head, the said hollow head being in communication with the said chambers and having an internal flange at the lower edge thereof, the said second portion being limited in its upward movement in relation to the head portion by the valve engaging the seat and a spring spider secured to the said second portion and adapted to be engaged by the flange of the head portion to limit downward movement of the second portion in relation to the head portion.

3. A piston for use in a cylinder having a pair of inlet ports, comprising in combination a hollow head portion having a central aperture provided with a valve seat, a series of piston rings carried by the said head portion, a second portion to which power is applied for reciprocation having chambers on opposite sides thereof into which the said ports open, a valve secured to the said second portion and adapted to seat in the head, the said hollow head being in communication with the said chambers, and a plurality of spring spiders secured to the said second portion and having a series of arms limiting movement of the head portion away from the valve.

4. A piston for reciprocation in a cylinder consisting of two parts adapted for relative movement, both of said parts fitting the cylinder wall, one of said parts providing a hollow head having an aperture in the end, the other part extending into the head, a valve member secured to said other part and fitting the aperture of the hollow head, a member providing spring arms secured between the valve and the said second part for engaging the hollow head tending to hold the head closed against the valve, the structure providing for an ingress of fluid between the parts fitting the cylinder, the said cylinder having a port opening thereto.

5. A piston for use in a cylinder having a pair of inlet ports, comprising in combination a hollow head portion having a central aperture provided with a valve seat, a series of piston rings carried by the said head portion, a second portion to which power is applied for reciprocation having chambers on opposite sides thereof into which the said ports open and a valve secured to the said second portion and adapted to seat in the head, the said hollow head being in communication with the said chambers and spring means carried by said second portion limiting movement of the head portion away from the valve.

6. In a piston, the combination of a hollow head portion movable in relation to the remainder of the piston and having a central aperture provided with a valve seat, a second portion to which power is applied for reciprocation, provided with chambers on the opposite sides thereof and a valve secured to the said second portion and adapted to seat in the hollow head, the said hollow head being in communication with the said chambers, and a spider having spring arms secured between the valve and said second portion and engaging the hollow head whereby said head is limited in its movement in relation to the said valve.

7. A piston for use in a compressor cylinder having a side inlet port, comprising a head portion having an aperture provided with a valve seat, a second portion to which power is applied for reciprocating the piston having a valve adapted to seat on said valve seat, the fluid compressed passing through said port and said aperture, and cushioning spring means carried by the piston for limiting the movement of the head portion away from the valve.

In testimony whereof, I sign this specification.

JAMES H. DENNEDY.